United States Patent
Park

(10) Patent No.: US 7,230,893 B2
(45) Date of Patent: Jun. 12, 2007

(54) METHOD OF FORMATTING OPTICAL RECORDING MEDIUM

(75) Inventor: Yong Cheol Park, Kwachun-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/768,131

(22) Filed: Jan. 23, 2001

(65) Prior Publication Data

US 2001/0009537 A1    Jul. 26, 2001

(30) Foreign Application Priority Data

Jan. 26, 2000 (KR) .................................. 2000-3574

(51) Int. Cl.
*G11B 7/0045* (2006.01)
(52) U.S. Cl. .................. 369/47.14; 369/53.15; 369/53.17; 369/47.13
(58) Field of Classification Search ............. 369/47.14, 369/53.15
See application file for complete search history.

(56) References Cited

U.S. PATENT DOCUMENTS 5,111,444 A * 5/1992 Fukushima et al. ...... 369/47.14
5,241,531 A * 8/1993 Ohno et al. ............... 369/275.3
5,271,018 A * 12/1993 Chan ........................ 369/30.07
5,715,221 A * 2/1998 Ito et al. .................. 369/47.14
5,956,309 A * 9/1999 Yamamuro ............... 369/47.14
6,160,778 A * 12/2000 Ito et al. .................. 369/53.15
6,373,800 B1 * 4/2002 Takahashi ................ 369/53.15
6,741,534 B1 * 5/2004 Takahashi et al. ....... 369/53.15

* cited by examiner

*Primary Examiner*—Andrea Wellington
*Assistant Examiner*—Jorge L. Ortiz-Criado
(74) *Attorney, Agent, or Firm*—Lee, Hong, Degerman, Kang & Schmadeka

(57) ABSTRACT

A method of formatting a rewritable optical recording medium includes registering defective blocks in a primary defect lists (PDL) and performing a slipping replacement corresponding to the number of PDL registrations, determining whether an error has occurred in the slipping replacement, and if it is determined that the error has occurred in the slipping replacement, adjusting a recording capacity of the optical recording medium by checking the number of un-slipped PDLs and reducing the recording capacity by the number of un-slipped PDLs. As a result, even if the error has occurred in the slipping replacement due to insufficient spare area, the PDL registration is still maintained without formatting error, thereby causing the optical recording medium to be usable.

14 Claims, 5 Drawing Sheets

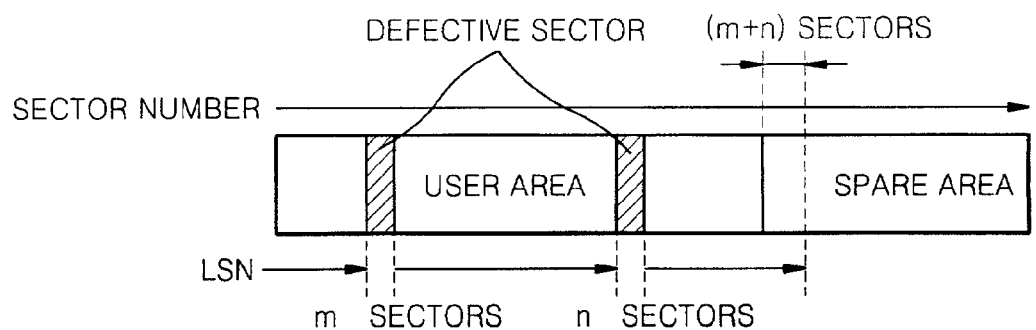
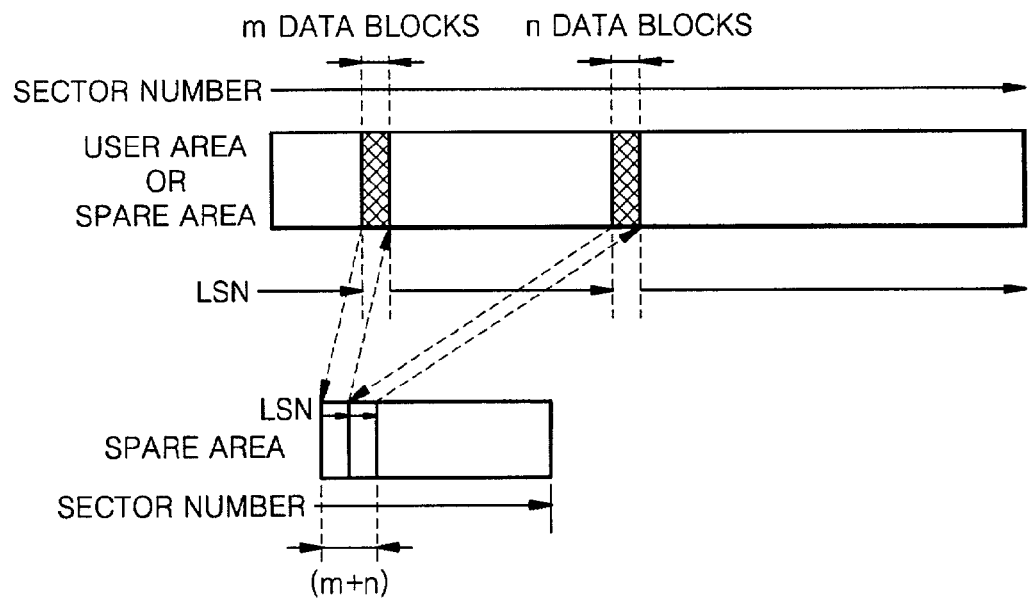

FIG. 3
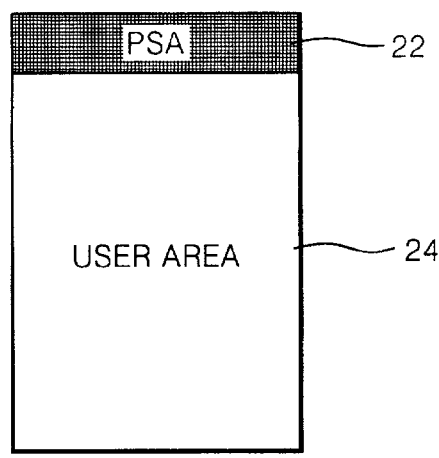
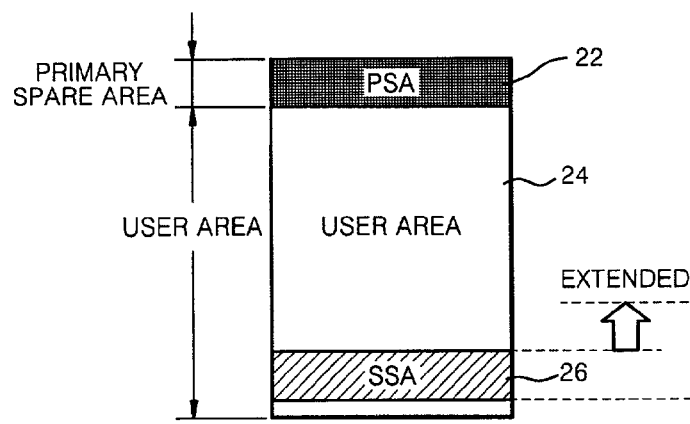   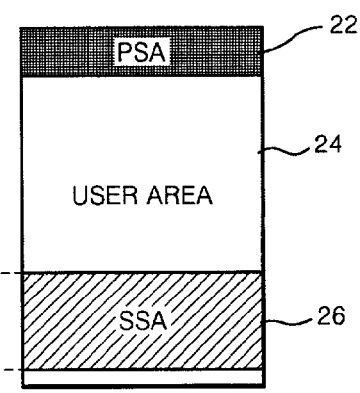
FIG. 4A              FIG. 4B

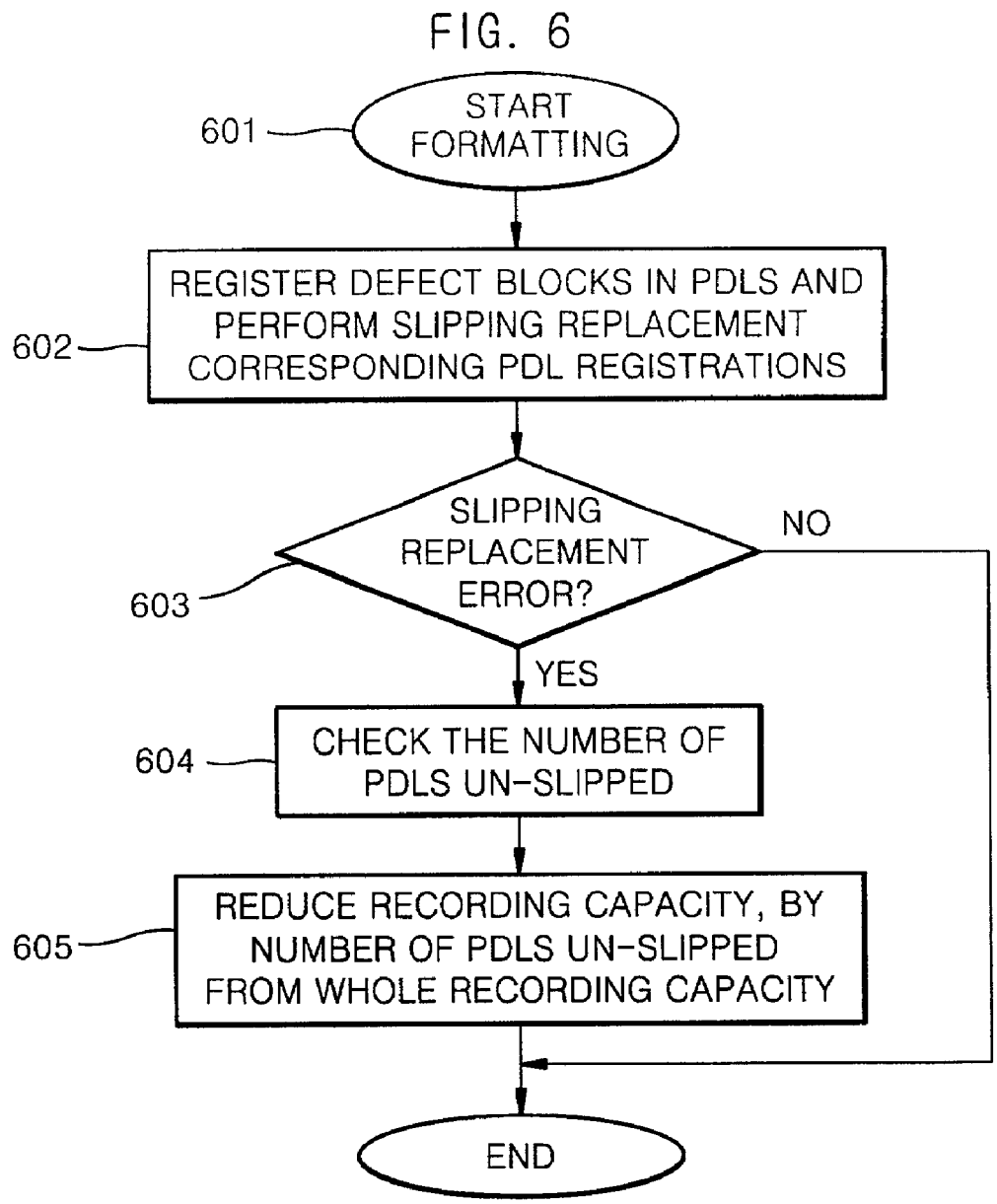

METHOD OF FORMATTING OPTICAL RECORDING MEDIUM

CROSS REFERENCE TO RELATED ART

This application claims the benefit of Korean Patent Application No. 2000-3574, filed on Jan. 26, 2000, which is hereby incorporated by reference in its entirety.

BACKGROUND OF THE INVENTION

1. Field of the Invention

The present invention relates to an optical recording medium defect management method, and more particularly, a method of formatting a rewritable optical recording medium.

2. Discussion of the Related Art

Generally, an optical recording medium is classified into three types depending on whether or not data can be repeatedly recorded on the medium: a read only memory (ROM) type, a write once read many (WORM) type, on which data can be written only once, and a rewritable type, on which data can be repeatedly written.

As a repeatedly rewritable disc, there are two types: a rewritable compact disc (CD-RW) and a rewritable digital versatile disc (DVD-RAM, DVD-RW). In case of such a rewritable optical disc, as a write/read operation of information is repeatedly performed, the mixing ratio of the mixtures that constitute a recording layer for recording information thereon becomes different from the initial mixing ratio. The mixing ratio loses the characteristic of the recording layer itself, and this causes an error to occur during the write/read operation of the information.

This phenomenon is called deterioration, and a deteriorated area appears as a defect area during the performance of optical disc initializing, writing, and reading commands. Also, in addition to deterioration, a defect area of a rewritable optical disc may be caused by a scratch on the disc surface, fine dust on the disc, error during production of the disc, etc. Accordingly, management of such a defect area is required in order to prevent data from being written/read on the defect area formed by the above-described causes.

SUMMARY OF THE INVENTION

Accordingly, the present invention is directed to a method of formatting optical recording medium that substantially obviates one or more of the problems due to limitations and disadvantages of the related art.

It is an object of the present invention to provide a formatting method which can perform a valid and effective formatting even where an error occurs during the slipping replacement due to the lack of the spare area.

It is another object of the present invention to provide a defect management method for efficiently using the recording medium.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve the above object, there is provided a method of formatting a recording medium having a predetermined recording capacity including a spare area. The method comprises the steps of: registering defective segment addresses corresponding to defective segments in a first defect list in the recording medium; performing a first defect replacement in response to the defective segment addresses in the first defect list; determining a first defect replacement error, wherein the first defect replacement error is caused when a size of the defective segments exceeds the spare area; checking un-slipped segments by determining a number of the defective segments not subjected to the first defect replacement due to insufficient spare area; and adjusting the predetermined recording capacity of the recording medium by the number of un-slipped segments.

According to one aspect of the present invention, the first defect list is a primary defect list (PDL). Preferably, the first defect replacement is a slipping replacement.

According to another aspect of the present invention, each defective segment comprises a defective block. Alternatively, each defective segment may comprise a defective sector.

More particularly, according to the present invention, a method of formatting a rewritable optical recording medium comprises registering defective sectors in a primary defect lists (PDL) and performing a slipping replacement corresponding to the number of PDL registrations, determining whether an error has occurred in the slipping replacement, and if it is determined that the error has occurred in the slipping replacement, adjusting a recording capacity of the optical recording medium by checking the number of un-slipped PDLs and reducing the recording capacity by the number of un-slipped PDLs. As a result, even if the error has occurred in the slipping replacement due to insufficient spare area, the PDL registration is still maintained without formatting error, thereby causing the optical recording medium to be usable.

According to one aspect of the present invention, the recording capacity adjusting step changes recording capacity information written in a specified area of the optical recording medium.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

FIG. 2A is a view explaining a slipping replacement method;

FIG. 2B is a view explaining a linear replacement method;

FIG. 3 is a view illustrating an example of the structure where the spare area is allocated at the top of the data area;

FIGS. 4A and 4B are views illustrating allocations of supplement and primary spare areas;

FIG. 6 is a flowchart illustrating the formatting method of an optical recording medium according to the present invention.

DETAILED DESCRIPTION OF THE PREFERRED EMBODIMENTS

Hereinafter, the present invention will be described with respect to the preferred embodiment illustrated in the annexed drawings (for example DVD-RAM).

Figure 1:
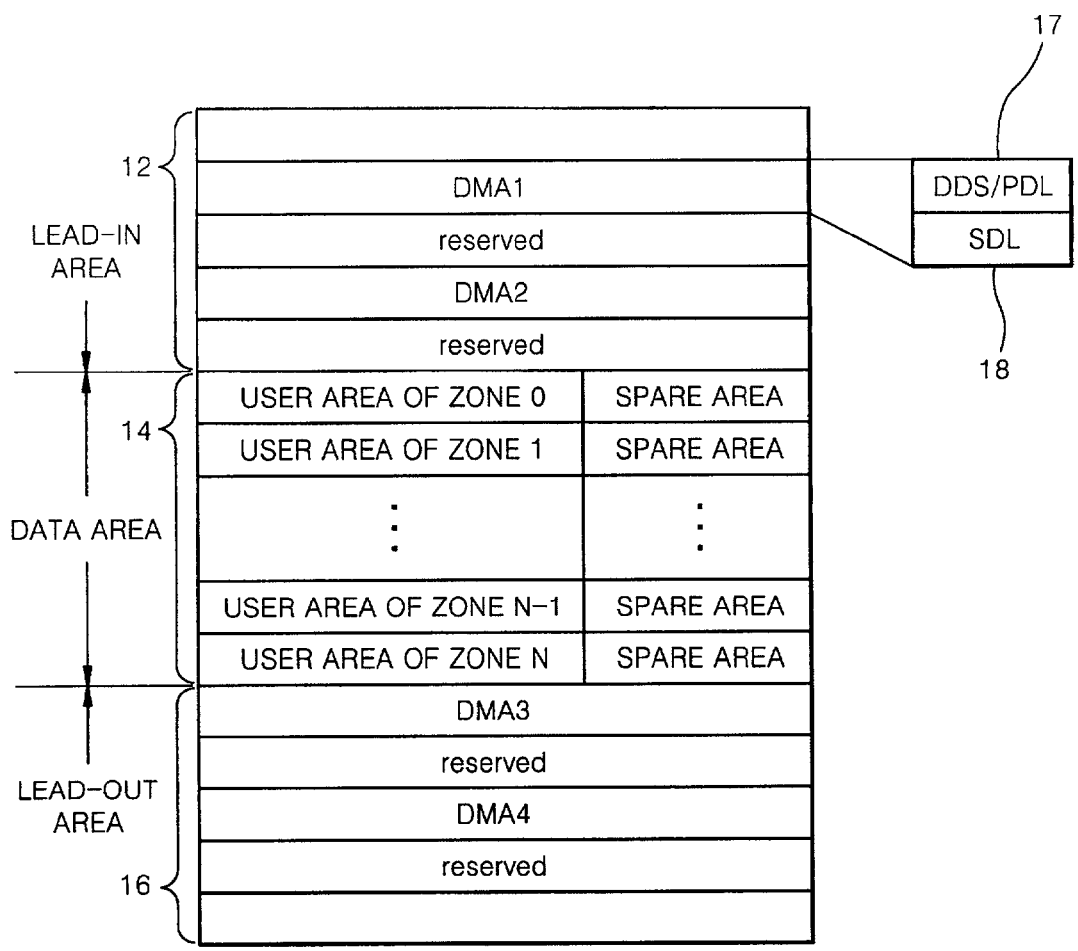
FIG. 1 is a view conceptually illustrating the formatting structure of an optical disc.

As shown in FIG. 1, the defective area of the optical disc is managed by placing defect management areas (DMAs) in a lead-in area 12 and a lead-out area 16 of the optical disc. A data area 14 is divided into zones for management, and each zone is divided into user and spare areas. The user area is where actual information data, such as audio/video data, is written. Alternatively, the spare area is used when a defect is produced on the user area.

Generally, four DMAs exist in one disc. Two DMAs exist in the lead-in area, and the remaining two DMAs exist in the lead-out area. Each DMA is composed of two blocks, which correspond to 32 sectors in total (each block has 16 sectors.) The first block (i.e., DDS/PDL block) of the respective DMA includes a disc definition structure (DDS) and a primary defect list (PDL) 17, and the second block (i.e., SDL block) of the respective DMA includes a secondary defect list (SDL) 18. The PDL 17 represents a primary defect data storage section, and the SDL 18 represents a supplement defect data storage section.

Generally, the PDL 17 stores therein defects produced during the disc manufacturing process, and entries of all the defective sectors identified during the formatting (i.e., initialization) and re-formatting (i.e., re-initialization) of the disc. The respective entry comprises sector numbers corresponding to the entry type and defective sector.

In particular, the PDL 17 is a list of physical sector numbers (physical addresses) of sectors which are determined as defective at the manufacturing time or at the initial time, such as the application starting time. The sector numbers indicate sectors to be subjected to the replacement process (slipping replacement algorithm) by the slipping process in units of one sector. In the PDL 17, primary defect list identification data, the number of addresses as the number of defects, and physical sector numbers indicating defective sectors are described.

The SDL 18 is listed in the unit of a block, and stores therein the entries of the defect areas produced after the formatting, and the defect areas that cannot be stored in the PDL during the formatting. The respective SDL entry is composed of an area for storing the sector number of the first sector of the block where the defective block is produced, and an area for storing the sector number of the first sector of the block to be substituted therefor.

In particular, the SDL 18 is a list for defective blocks having sectors which are determined as defective at the recording time other than the above initial time. That is, it is a list of the physical sector numbers (physical addresses) of the first or head sectors of defective blocks having sectors which are determined as defective when data are recorded for preset defective blocks and the physical sector numbers (physical addresses) of the first sectors of replacement blocks (spare blocks) which are used for replacement for the defective blocks.

In the SDL 18, secondary defect list identification data, the number of entries as the number of defects, physical sector numbers indicating first sectors as the addresses of defective blocks and physical sector numbers indicating the first sectors as the defective blocks are described. The addresses of the defective blocks and the addresses of the replacement blocks for the defective blocks are described in one-to-one correspondence.

Preferably, the defect areas (i.e., defective sectors or defective blocks) in the data area 14 should be replaced by good or effective areas. This can be effected by either a slipping replacement or a linear replacement.

The slipping replacement is used in the case where the defect area is registered in the PDL. As shown in FIG. 2A, if a defective sector exists in the user area where the actual data is written, the defect area is skipped over, and a good sector that follows the defect area is substituted for the defect area to write data thereon. At this time, the user area where the data is written is shifted to occupy the spare area as much as the skipped defective sector. That is, the spare area as much as the skipped defective sector is allocated as the user area. For example, if two defect areas are registered in the PDL, the data is written to the two shifted sectors in the spare area.

The linear replacement is used in the case where the defect area is registered in the SDL. As shown in FIG. 2B, if a defective block exists in the user area, it is replaced by the replacement area allocated in the spare area in the unit of a block. In allocating the spare area, in addition to the method shown in FIG. 1, alternative allocation of the spare area may be considered where the spare area is allocated only to one zone of the data area, or to a portion of the data area.

FIG. 3 shows a method of placing the spare area at the beginning of the data area. At this time, the spare area is called a primary spare area (PSA) 22, and thus the remaining data area except the primary spare area 22 will be the user area 24.

The PSA 22 is an area allocated during the formatting process. It may be allocated when the optical disc is manufactured by a disc manufacturer, or may be allocated when a user initializes a blank disc.

If the defective sectors are registered in the PDL during formatting or re-formatting, no data is written in the defective sectors, and thus the recording capacity is reduced to that extent. Accordingly, in order to maintain the initial data recording capacity, the PSA is slipped into the user area in an area equal to the defective sectors registered in the PDL during formatting. That is, the physical sector numbers (PSNs) to which the logical start number (LSN=0) of the user area is given are changed in accordance with the defective sectors registered in the PDL during the formatting.

If the PSA 22 becomes full as a result of slipping replacement or linear replacement, a new spare area may be allocated near the end of the user area as shown in FIG. 4A. The spare area is called a supplement spare area (SSA) 26. That is, since important data is recorded at the end of the user area, the supplement spare area 26 is not allocated at the end of the user area, but is allocated near the end of the user area.

At this time, the position information of the supplement spare area (SSA) 26 is stored in a specified area of the optical disc (for example, in the SDL block of the DMA). The position information of the supplement spare area includes a start address (i.e., a first sector number) and an end address (i.e., a last sector number) of the allocated supplement spare area. The size and position of the supplement spare area can be recognized using the position information.

Also, when needed, the supplement spare area 26 can be increased as shown in FIG. 4B. In this case, the position information of the supplement spare area is also stored in the SDL block of the DMA. Since the position information of the supplement spare area 26 has been already stored in the SDL block, only the start address of the stored position information of the supplement spare area 26 is updated. In other words, the position information or address of the supplement spare area 26 is updated whenever the supplement spare area 26 is increased.

For the defect area management of the optical disc allocated with the above-described spare area, defective sectors or defective blocks are registered in the PDL or SDL. To operate around the defective sectors or blocks, either the linear replacement or the slipping replacement method may also be applied and used.

According to the linear replacement method, an optical pickup is moved to the spare area, and then moved again to the user area to write the data of the defective block registered in the SDL in the replacement block allocated to the spare area. Thus, system performance may deteriorate due to the repetition of the above-described process.

The reason for re-formatting is to increase the performance of the system by moving or reallocating the defective sectors registered in the SDL to the PDL and reducing continuous linear replacement.

Re-formatting is generally classified as a formatting through certification (for example, full formatting) and a simple formatting without certification (for example, conversion of SDL to G2-list). In the simple formatting, the P-list is not changed after any formatting. In the case of G2-list, since the defective blocks in the SDL are stored as the defective sectors, any good sector included therein is considered to be the defective sector.

Figure 5A:
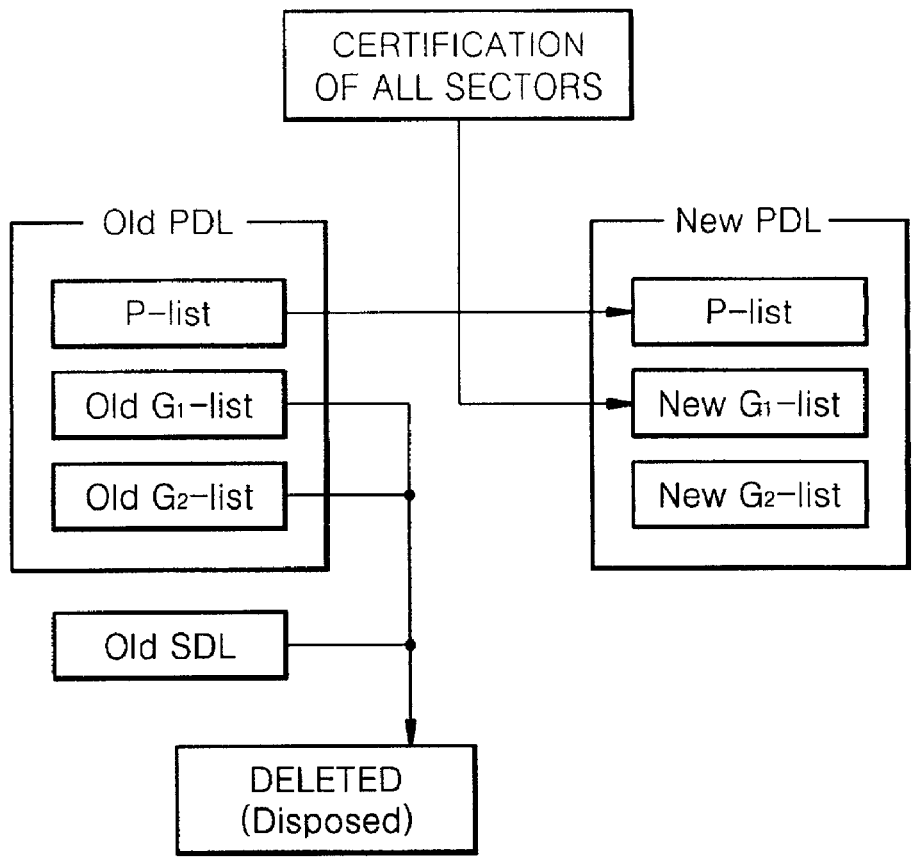
FIG. 5A is a view illustrating a full formatting with certification of the recording medium.

Specifically, as shown in FIG. 5A, during full formatting of the recording medium, the old DMA information is read and all the data areas except the defective sectors registered in a protection area and in the P-list of the old PDL are certified. Thereafter, the P-list of the old PDL is converted as-is into the P-list of a new PDL. Also, the G1-list, G2-list, and old SDL of the old PDL are deleted. Instead, only the defective sectors found during the certification process are registered in the G1-list of the new PDL.

Figure 5B:
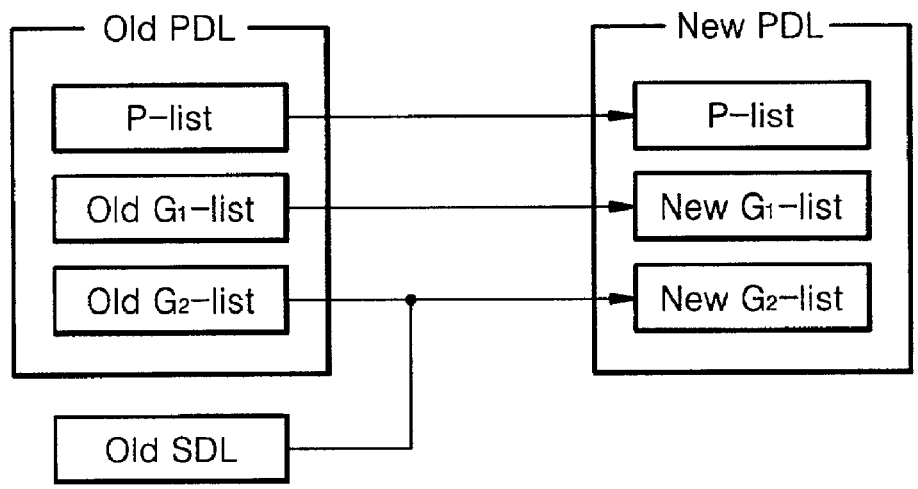
FIG. 5B is a view illustrating a simple formatting without certification of the recording medium.

As shown in FIG. 5B, during simple formatting of the recording medium for converting the SDL to the G2-list without certification, the old DMA information is read and the sectors in the P-list, G1-list, and G2-list of the old PDL are converted as-is into the P-list, G1-list, and G2-list of the new PDL. Also, the old SDL entries are converted into 16 PDS entries. The corresponding SDL entries are deleted, and then the converted entries are registered in the G2-list of the new PDL.

Through the re-formatting processes described above, the defect information in the SDL moves into the PDL. The slipping replacement to the spare area is produced corresponding to the number of the PDL registrations.

Accordingly, if an error is produced for the lack of the sufficient spare area during the slipping replacement, it is processed as a formatting error, and the corresponding optical disc is considered to be useless and had to be discarded. In particular, there is great probability that such a problem occurs in the case where the spare area is insufficient for the number of PDL registrations.

The present invention relates to the reduction of the recording capacity by the number of un-slipped PDLs from the whole recording capacity of a recording medium, such as an optical disc, during formatting of such medium. This is to prevent an error caused by insufficient spare area even if the error occurs during the slipping replacement due to the lack of the spare area. This may be achieved by registering the error as the PDL to continuously perform the defect management, and simultaneously excluding or reducing the corresponding portion from the whole recording capacity.

FIG. 6 illustrates a flowchart illustrating a method of formatting an optical disc according to a preferred embodiment of the present invention. Referring to FIG. 6, if a formatting command is inputted (step 601), the defective blocks are registered as the PDL, and the slipping replacement to the spare area is performed corresponding to the number of PDL registrations (step 602). This operation is performed irrespective of the formatting method (i.e., full formatting or simple formatting for conversion of SDL to G2-list).

At this time, it is determined whether or not an error has occurred in the slipping replacement due to the lack of the spare area (step 603) in the recording medium. If it is confirmed that the error has occurred in the slipping replacement, it corresponds to the case that the allocated area of the spare area is insufficient in comparison to the total number of PDL registrations. In this case, although the defective blocks can be continuously registered in the PDLs, the slipping replacement is not performed due to the lack of the spare area. According to the conventional method as described above, such case is processed as a disc error, and the disc is determined to be useless.

According to the preferred embodiment of the present invention, the following steps are performed. In particular, if the error occurs in the slipping replacement, the number of un-slipped PDLs is confirmed (step 604).

If the number of un-slipped PDLs is determined at step 604, the recording capacity totaling the number of up-slipped PDLs is excluded from the whole recording capacity (step 605). Since the defective blocks registered as PDLs are excluded from the logical sector numbers (LSNs) thereafter, no data can be written in the defective blocks.

On a recording medium, such as DVD-RAM, LSNs are assigned to physical sectors of the user area in order starting from the inner periphery to consecutively show only the sectors used for recording data. Generally, it is known to one of ordinary in the art that the area that records user data and is composed of sectors that have been assigned an LSN is called the volume area.

According to the conventional method, the defect management is performed in a manner that this portion is slipped to the spare area without changing the entire recording capacity. However, since the slipping replacement error generally occurs due to the insufficient spare area, any further slipping replacement cannot be performed.

According to the present invention, because the corresponding portion is excluded from the entire recording capacity instead of not performing the slipping replacement, the PDL registration can be continuously performed. In this case, the entire recording capacity may be reduced, but the fatal error may be prevented that renders the optical disc to become useless due to the lack of the spare area.

The adjustment of the entire recording capacity can be performed in various ways. However, since the information on the whole number of LSNs is written in the DMA in case of the DVD-RAM, the adjustment is performed to match the adjusted recording capacity.

As described above, according to the optical recording medium and the formatting method according to the preferred embodiment of the present invention, the problem where the optical recording medium becomes useless when an error occurs in the slipping replacement during the formatting can be solved. This enables an effective use of the optical recording medium.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method of formatting a recording medium having a recording capacity, comprising the steps of:

receiving a command for formatting the recording medium;

registering defective areas in primary defect lists (PDL) and performing a slipping replacement corresponding to a number of PDL entries if the command is received;

determining whether a slipping replacement error occurred in response to the number of PDL entries;

checking a number of un-slipped PDL entries if a slipping replacement error occurred; and adjusting the recording capacity of the recording medium based on the number of un-slipped PDL entries by excluding a capacity corresponding to the number of un-slipped PDL entries without adjusting a spare area.

2. The method of claim 1, wherein a recording capacity information written in a specified area of the recording medium is updated to indicate the adjusted capacity, wherein the recording capacity information indicates total logical sector numbers.

3. A method of formatting a recording medium having a predetermined recording capacity including a spare area for replacing defect areas, the method comprising the steps of:

registering defective area information in a defect area management list if a command for formatting the recording medium is received;

replacing the defective areas with corresponding spare areas in response to the number of registered detective areas in the defect area management list during the formatting;

confirming whether or not an error has occurred due to lack of the spare area in comparison to the defective areas; and adjusting the recording capacity of the recording medium based on the number of unreplaced defective areas if it is confirmed that an error occurred without adjusting the spare area.

4. The method of claim 3, wherein the recording capacity adjusting step comprises excluding a capacity corresponding to the number of unreplaced defective areas.

5. The method of claim 4, wherein the recording capacity information written in a specified area of the recording medium is updated to indicate the adjusted capacity, wherein the recording capacity information indicates total logical sector numbers.

6. A method of formatting a recording medium having a predetermined recording capacity including a spare area, the method comprising the steps of:

registering defective segment addresses corresponding to defective segments in a defect list in the recording medium if a command for formatting the recording medium is received;

performing a defect replacement corresponding to the defective segment addresses registered in the defect list during the formatting, the defect replacement for replacing defective segments;

determining if an error occurred during the defect replacement, wherein the error is caused when a size of the defective segments exceeds the spare area;

stopping the defect replacement if an error occurred and checking un-slipped segments by determining a number of the defective segments not subjected to the defect replacement due to insufficient spare area; and excluding a portion from the recording capacity without adjusting a spare area, the portion corresponding to the number of un-slipped segments, thereby managing the un-slipped segments continuously.

7. The method of claim 6, wherein the first defect list is a primary defect list (PDL).

8. The method of claim 6, wherein defect replacement comprises slipping replacement performed during the formatting process.

9. The method of claim 6, wherein each defective segment comprises a defective sector.

10. The method of claim 6, further comprising updating recording capacity information to indicate the excluded portion.

11. The method of claim 10, wherein the recording capacity information is total logical sector numbers.

12. A method of formatting a recording medium having a recording capacity, comprising the steps of:

receiving a command for formatting the recording medium;

performing a slipping replacement corresponding to a number of primary defect lists (PDL) entries;

determining whether a slipping replacement error has occurred in response to the number of PDL entries;

checking a number of un-slipped PDL entries if a slipping replacement error has occurred; and excluding a portion from the recording capacity without adjusting a spare area, the portion corresponding to the number of un-slipped PDL entries.

13. The method of claim 12, further comprising updating recording capacity information to indicate the excluded portion.

14. The method of claim 13, wherein the recording capacity information is total logical sector numbers.

* * * * *